United States Patent
Pan

(10) Patent No.: US 12,417,590 B2
(45) Date of Patent: Sep. 16, 2025

(54) METHOD FOR DETERMINING PHYSICAL CHARACTERISTICS OF OBJECTS, HOST, AND COMPUTER READABLE STORAGE MEDIUM

(71) Applicant: HTC Corporation, Taoyuan (TW)

(72) Inventor: Sheng-Yang Pan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 51 days.

(21) Appl. No.: 17/955,568

(22) Filed: Sep. 29, 2022

(65) Prior Publication Data

US 2023/0267693 A1 Aug. 24, 2023

Related U.S. Application Data

(60) Provisional application No. 63/311,460, filed on Feb. 18, 2022.

(51) Int. Cl.
*G06T 19/00* (2011.01)
*G06T 7/20* (2017.01)

(52) U.S. Cl.
CPC ............. *G06T 19/006* (2013.01); *G06T 7/20* (2013.01)

(58) Field of Classification Search
CPC ................................ G06T 19/006; G06T 7/20
USPC ........................................................ 345/633
See application file for complete search history.

(56) References Cited

U.S. PATENT DOCUMENTS

| | | | |
|---|---|---|---|
| 2016/0049005 A1* | 2/2016 | Mullins ................. | G06T 19/006 345/420 |
| 2019/0102946 A1* | 4/2019 | Spivack ................ | G06T 19/003 |
| 2019/0391638 A1 | 12/2019 | Khaderi et al. | |
| 2020/0175759 A1* | 6/2020 | Russell ................. | G06F 18/214 |

FOREIGN PATENT DOCUMENTS

| | | |
|---|---|---|
| CN | 112424727 | 2/2021 |
| TW | I370385 | 8/2012 |

OTHER PUBLICATIONS

"Office Action of Taiwan Counterpart Application", issued on May 24, 2023, p. 1-p. 9.

* cited by examiner

*Primary Examiner* — Hai Tao Sun
(74) *Attorney, Agent, or Firm* — JCIPRNET

(57) ABSTRACT

The embodiments of the disclosure provide a method for determining physical characteristics of objects, a host, and a computer readable storage medium. The method includes: detecting a first physical object in an environment; obtaining a first motion behavior of a reference object, wherein the first motion behavior corresponds to an interact event of the reference object interacting with the first physical object; and determining a first physical characteristic of the first physical object based on the first motion behavior.

14 Claims, 3 Drawing Sheets

METHOD FOR DETERMINING PHYSICAL CHARACTERISTICS OF OBJECTS, HOST, AND COMPUTER READABLE STORAGE MEDIUM

CROSS-REFERENCE TO RELATED APPLICATION

This application claims the priority benefit of U.S. provisional application Ser. No. 63/311,460, filed on Feb. 18, 2022. The entirety of the above-mentioned patent application is hereby incorporated by reference herein and made a part of this specification.

BACKGROUND

1. Field of the Invention

The present disclosure generally relates to a mechanism for determining characteristics of objects, in particular, to a method for determining physical characteristics of objects, a host, and a computer readable storage medium.

2. Description of Related Art

In mixed reality (MR) applications, virtual objects can interact with the real environment. At present, there are existing methods or third-party solutions that can scan the appearance of the environment, and have achieved physical interactions such as collision and rebound of virtual objects when these virtual objects interact with the environment. However, there is no way to get the material of the environment through technologies such as camera or lidar, so the movement of the virtual object in response to the interaction with the environment may not be realistic enough.

For example, assuming that the user throws a virtual object (e.g., a rendered virtual ball) toward a physical object (e.g., a physical wall in the real world) in the MR world, the virtual object may be rebounded after virtually interacts with the physical object.

However, since the material of the physical object is unavailable, the rebounding movement of the virtual object may be unrealistic. In this case, the rebounding movements of the virtual object may be same regardless of the type physical object. For example, the rebounding movement of the virtual object after virtually interacting with a physical wall may be the same as the rebounding movement of the virtual object after virtually interacting with a physical sponge, which may degrade the user experience.

SUMMARY OF THE INVENTION

Accordingly, the disclosure is directed to a method for determining physical characteristics of objects, a host, and a computer readable storage medium, which may be used to solve the above technical problems.

The embodiments of the disclosure provide a method for determining physical characteristics of objects, adapted to a host, including: detecting a first physical object in an environment; obtaining a first motion behavior of a reference object, wherein the first motion behavior corresponds to an interact event of the reference object interacting with the first physical object; and determining a first physical characteristic of the first physical object based on the first motion behavior.

The embodiments of the disclosure provide a host including a storage circuit and a processor. The storage circuit stores a program code. The processor is coupled to the non-transitory storage circuit and accesses the program code to perform: detecting a first physical object in an environment; obtaining a first motion behavior of a reference object, wherein the first motion behavior corresponds to an interact event of the reference object interacting with the first physical object; and determining a first physical characteristic of the first physical object based on the first motion behavior.

The embodiments of the disclosure provide a computer readable storage medium, the computer readable storage medium recording an executable computer program, the executable computer program being loaded by a host to perform steps of: detecting a first physical object in an environment; obtaining a first motion behavior of a reference object, wherein the first motion behavior corresponds to an interact event of the reference object interacting with the first physical object; and determining a first physical characteristic of the first physical object based on the first motion behavior.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
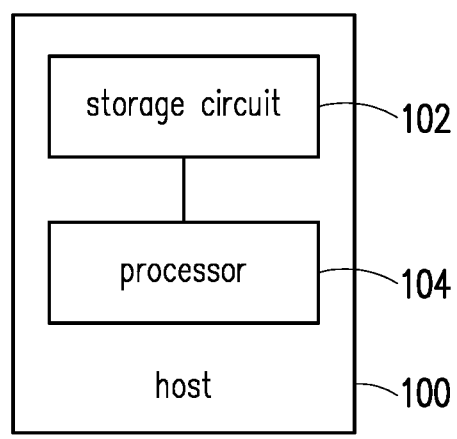
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be implemented as any smart device and/or computer device, but the disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or program codes that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In one embodiment, the host 100 can be disposed with a (front) camera for capturing images of a process of a reference object interacting with a physical object in the real world. In another embodiment, the host 100 can also receive theses images from other external cameras, but the disclosure is not limited thereto.

In one embodiment, the reference object can be understood as a real object used to interact with the physical object, such that the host 100 can determine the physical characteristic of the physical object based on the motion behavior of the reference object after the reference object interacting with the physical object.

In one embodiment, the host 100 can determine the motion data of the reference object via analysing the captured images of the reference object and accordingly determine the motion behavior of the reference object related to the process of the reference object interacting with the physical object. In one embodiment, the host 100 can determine the pose (e.g., position and/or orientation) of the reference object in each captured image as the motion data, but the disclosure is not limited thereto.

In one embodiment, the reference object can be disposed with a motion detection element (IMU) or the like for detecting the motion data (e.g., 6 degree-of-freedom) of the reference object, such that the host 100 can determine the motion behavior of the reference object based on the motion data received from the reference object.

In one embodiment, the reference object can be a tracker, and the host 100 can determine the motion data via performing tracking functions such as inside out tracking. For example, the reference object can be disposed with several light emitting elements for emitting visible/invisible lights for the host 100 to capture as images, and the host 100 can determine the motion data of the reference object via analysing the light distribution of the lights emitted by the light emitting elements in the images.

In one embodiment, the reference object as the tracker can detect its motion data via the outside in tracking function. For example, the reference object can detect the motion data based on the beacons emitted from several base stations disposed in the environment where the reference object locates, but the disclosure is not limited thereto.

In one embodiment, the reference object can be disposed with one or more strain gauge for detecting the deformation of the reference object as apart of the motion data. In this case, the host 100 can accordingly determine the deformation degree of the reference object based on the readings of the strain gauge from the reference object.

In one embodiment, the reference object and the host 100 can be disposed with corresponding communication modules (e.g., Bluetooth modules) for the transmissions of the motion data collected by the reference object, but the disclosure is not limited thereto.

In the embodiments of the disclosure, the processor 104 may access the modules and/or program codes stored in the storage circuit 102 to implement the method for determining physical characteristics of objects provided in the disclosure, which would be further discussed in the following.

Figure 2:
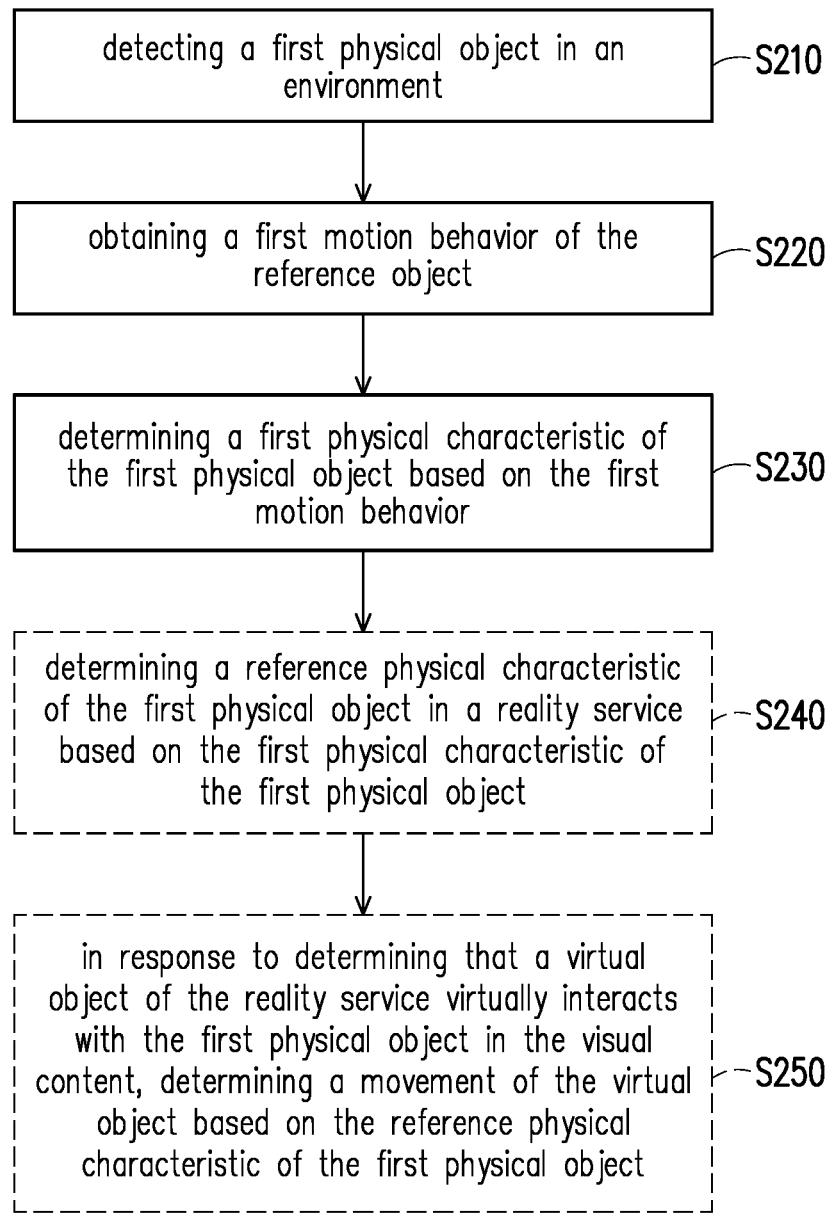
FIG. 2 shows a flow chart of the method for determining physical characteristics of objects according to an embodiment of the disclosure.
Figure 3:
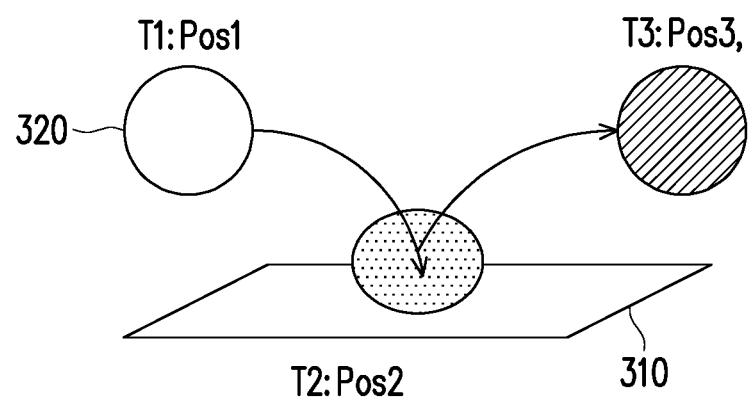
FIG. 3 shows a schematic diagram of a process of the reference object interacting with a first physical object according to an embodiment of the disclosure.

See FIG. 2, which shows a flow chart of the method for determining physical characteristics of objects according to an embodiment of the disclosure. The method of this embodiment may be executed by the host 100 in FIG. 1, and the details of each step in FIG. 2 will be described below with the components shown in FIG. 1. In addition, FIG. 3 would be used as an example for better explaining the concept of the disclosure, wherein FIG. 3 shows a schematic diagram of a process of the reference object interacting with a first physical object according to an embodiment of the disclosure.

In step S210, the processor 104 detects the first physical object 310 in an environment 300. In one embodiment, the environment 300 may be a space (e.g., a field and/or a room, etc.) where the reference object 320 and the first physical object 310 locates in the real world.

In one embodiment, the processor 104 may obtain an environment image (via the (front) camera therein or the external camera) of the environment 300 and detect the first physical object 310 via performing an image recognition process on the environment image.

In another embodiment, the processor 104 can detect the first physical object 310 based on the scanning data collected by a lidar scanning the environment 300, but the disclosure is not limited thereto.

In FIG. 3, the first physical object 310 may be a surface of a certain real object (e.g., a table) in the environment 300, but the disclosure is not limited thereto. In other embodiment, the first physical object 310 can be any object whose physical characteristic needs to be determined.

In step S220, the processor 104 obtains a first motion behavior of the reference object 320, wherein the first motion behavior corresponds to an interact event of the reference object 320 interacting with the first physical object 310. In one embodiment, the interact event can be a contact event of the reference object 320 contacting with the first physical object 310, but the disclosure is not limited thereto.

In the embodiments of the disclosure, the user may move the reference object 320 (e.g., a physical ball) toward the first physical object 310 via, for example, throwing the reference object 320 toward the first physical object 310 while using the reference object 320 to interact with the first physical object 310. In another embodiment, the user may roll or slide the reference object 320 on the first physical object while using the reference object 320 to interact with the first physical object 310.

In one embodiment, the processor 104 can firstly determine a specific duration in which the interact event of the reference object 320 interacting with the first physical object 310 occurs. In one embodiment, the processor 104 can determine the specific duration based on the moving speed of the refence object 320.

In the embodiments of the disclosure, the host 100 can determine the moving speed of the reference object 320 corresponding to each of a plurality of timing points based on the motion data of the reference object 320. For example, if motion data indicates that the reference object 320 moves from a position Pos1 to a position Pos2 in a duration between timing points T1 and T2, the host 100 can determine the moving speed of the reference object 320 at the timing point T2 via dividing the distance from Pos2 to Pos1 with the duration between timing points T2 and T1. For another example, if motion data indicates that the reference object 320 moves from the position Pos2 to a position Pos3 in a duration between timing points T2 and T3, the host 100 can determine the moving speed of the reference object 320 at the timing point T3 via dividing the distance from Pos3 to Pos2 with the duration between timing points T3 and T2, but the disclosure is not limited thereto.

In one embodiment, the processor 104 may determine whether the moving speed of the reference object 320 reaches a predetermined speed (e.g., 0). In response to determining that the moving speed of the reference object 320 reaches, for example, 0 at an i-th timing point in case of the reference object 320 is moved toward the first physical object 310, it represents that the reference object 320 is contacting with the first physical object 310. In this case, the processor 104 may determine that the interact event occurs at the i-th timing point, wherein i is an index. Next, the processor 104 may determine a time window based on the i-th timing point, wherein the i-th timing point is within the time window, and determine the time window as the specific duration in which the interact event occurs.

For example, assuming that the moving speed of the reference object 320 reaches 0 at the timing point T2, the processor 104 may accordingly determine a time window as the specific duration. In FIG. 3, the time window may be a window ranged between the timing point T1 (which is before the timing point T2) and the timing point T3 (which is after the timing point T2), but the disclosure is not limited thereto.

In one embodiment, the processor 104 may subtract a first time from the timing point T2 as the beginning of the time window and/or add a second time to the timing point T2 as the end of the time window, wherein the first/second time can be determined based on the requirements of the designer.

In one embodiment, the processor 104 obtains a first motion data of the reference object 320 within the specific duration and determines the first motion behavior based on a first variation of the first motion data.

In the embodiments of the disclosure, the first motion behavior of the reference object 320 includes at least one of a moving speed, a moving distance, and a deformation degree of the reference object 320. In addition, the first physical characteristic of the first physical object 310 may include at least one of a friction coefficient, an elasticity, and a hardness, but the disclosure is not limited thereto.

In a first embodiment, it is assumed that the reference object 320 is sliding or rolling on the first physical object 310. For example, the user may put the reference object 320 on (a flat surface of) the first physical object 310 and push the reference object 320 to slide or roll on the first physical object 310, but the disclosure is not limited thereto. In this case, the processor 104 can determine a deceleration of the reference object based on the moving speed of the reference object 320 rolling or sliding on the first physical object 310. Next, the processor 104 can determine the friction coefficient of the first physical object 310 based on the deceleration of the reference object 320, wherein the friction coefficient of the first physical object 310 is positively related to the deceleration.

That is, the quicker the reference object 320 slows down during sliding or rolling on the first physical object 310 (i.e., higher deceleration), the processor 104 would determine the friction coefficient of the first physical object 310 to be a larger value. On the other hand, the slower the reference object 320 slows down during sliding or rolling on the first physical object 310 (i.e., lower deceleration), the processor 104 would determine the friction coefficient of the first physical object 310 to be a smaller value.

In a second embodiment, it is assumed that the reference object 320 is moved (e.g., thrown) toward the first physical object 310. In this case, the processor 104 can determine a rebounding distance of the reference object 320 based on the moving distance of the reference object 320 after the interact event occurs. Next, the processor 104 can determine the elasticity of the first physical object 310 based on the rebounding distance of the reference object 320, wherein the elasticity of the first physical object 310 is positively related to the rebounding distance.

That is, the farther the reference object 320 is rebounded by the first physical object 310, the processor 104 would determine the elasticity of the first physical object 310 to be a larger value. On the other hand, the closer the reference object 320 is rebounded by the first physical object 310, the processor 104 would determine the elasticity of the first physical object 310 to be a smaller value.

In a third embodiment, it is assumed that the reference object 320 is moved (e.g., thrown) toward the first physical object 310. In this case, the processor 104 can determine the deformation degree of the reference object 320 during the interact event. Next, the processor 104 can determine the hardness of the first physical object 310 based on the deformation degree of the reference object 310 during the interact event, wherein the hardness of the first physical object 310 is positively related to the deformation degree.

That is, the more the reference object 320 deforms during the interact event, the processor 104 would determine the hardness of the first physical object 310 to be a larger value. On the other hand, the less the reference object 320 deforms during the interact event, the processor 104 would determine the hardness of the first physical object 310 to be a smaller value.

Accordingly, the first physical characteristic of the first physical object 310 can be determined. In the embodiments of the disclosure, the physical characteristics (e.g., friction coefficients, elasticity and/or hardness) of the reference object 320 can be known or predetermined. In this case, the first physical characteristic of the first physical object 310 can be determined by comprehensively considering the first motion behavior of the reference object 320 and the physical characteristics of the reference object 320, but the disclosure is not limited thereto.

In other embodiments, the same mechanism introduced in FIG. 2 can be used to determine the physical characteristic of other physical object in the environment 300 or other environment.

For example, the processor 104 may perform: detecting a second physical object in an environment; obtaining a second motion behavior of the reference object 320, wherein the second motion behavior corresponds to another interact event of the reference object 320 interacting with the second physical object; and determining a second physical characteristic of the second physical object based on the second motion behavior, and the details thereof can be referred to the descriptions of FIG. 2.

In one embodiment, the processor 104 can further perform step S240 to determine a reference physical characteristic of the first physical object 310 in a reality service based on the first physical characteristic of the first physical object 310.

Specifically, in one embodiment, the host 100 can be a device (e.g., a head-mounted display (HMD)) for providing a visual content of the reality service (e.g., the MR service) to the wearer. In this case, the visual content (e.g., the MR content) provided by the host 100 can include both real objects and virtual objects, wherein the real objects may be the objects in front of the user and/or the HMD.

When the host 100 locates at the location of the environment, it is possible for the wearer of the HMD to see the first physical object 310 in the MR content provided by the host 100. In this case, the processor 104 can determine or apply the reference physical characteristic of the first physical object 310 in the MR service based on the first physical characteristic of the first physical object 310. For example, the processor 104 can determine or apply the friction coefficient, the elasticity, and/or the hardness of the first physical object 310 in the MR service based on the friction coefficient, the elasticity, and/or the hardness of the first physical object 310 determined in step S230.

Next, in step S250, in response to determining that a virtual object of the reality service virtually interacts with the first physical object 310 in the visual content, the processor 104 determines a movement of the virtual object based on the reference physical characteristic of the first physical object 310. In the embodiments of the disclosure, the virtual object can be designed to have physical characteristics (e.g., friction coefficient, elasticity and/or hardness) corresponding to the reference object 320 or have other predetermined physical characteristics. In this case, the processor 104 can determine the movement of the virtual object after virtually interacting with the first physical object 310 by comprehensively considering the physical characteristics of the virtual object and the first physical object 310, but the disclosure is not limited thereto.

Since the reference physical characteristic of the first physical object 310 in the visual content has been determined/applied based on the first physical characteristic of the first physical object 310 detected/measured in advance, the movement of the virtual object (whose physical characteristics have been determined to be corresponding to the reference object 320 or other known configurations) after virtually interacting (e.g., contacting) with the first physical object 310 in the reality service can be more realistic. Accordingly, the user experience can be improved.

For example, if the first physical object 310 is a glass table, the processor 104 may determine the reference physical characteristic of the first physical object 310 in the visual content to be with small friction coefficient, high hardness, and low elasticity. In this case, for a virtual object virtually sliding on the first physical object 310, the virtual object may slide for a relatively long distance. In addition, for a virtual object virtually bouncing on the first physical object 310, the virtual object may be rebounded for a relatively short distance/height.

For another example, if the first physical object 310 includes a set of springs, the processor 104 may determine the reference physical characteristic of the first physical object 310 in the visual content to be with large friction coefficient, low hardness, and high elasticity. In this case, for a virtual object virtually sliding on the first physical object 310, the virtual object may slide for a relatively short distance. In addition, for a virtual object virtually bouncing on the first physical object 310, the virtual object may be rebounded for a relatively large distance/height, but the disclosure is not limited thereto.

In one embodiment, the concept described in step S240 and S250 can be applied to other physical objects in the environment 300. For example, the processor 104 may determine the reference physical characteristic of the second physical object in the visual content of the reality service based on the second physical characteristic of the second physical object. In response to determining that a virtual object of the reality service virtually interacts with the second physical object in the visual content, the processor 104 can determine the movement of the virtual object based on the reference physical characteristic of the second physical object.

In one embodiment, after the processor 104 determines the first physical characteristic of the first physical object 310 in step S230, the processor 104 can correlate the first physical object 310 with the location of the environment 300 and store the first physical characteristic of the first physical object 310 in a database. In this embodiment, the first physical characteristic of the first physical object 310 in the database can be used for an electronic device providing the reality service to determine the reference physical characteristic of the first physical object in the reality service when locating at the location of the environment.

That is, when the location of the electronic device (e.g., another HMD) providing the MR service is determined to be locating at the location of the environment 300, it represents that it is possible for the wearer of the electronic device to see the first physical object 310 in the MR content provided by the electronic device.

In this case, the electronic device can obtain the first physical characteristic of the first physical object 310 from the database and accordingly determine the reference physical characteristic of the first physical object in the reality service. Accordingly, when the electronic device determines that a virtual object in the provided visual content virtually interacts with the first physical object 310, the electronic device can determine the movement of this virtual object based on the reference physical characteristic of the first physical object 310.

In other words, the electronic device does not need to perform steps S210 to S230 by itself to obtain the first physical characteristic of the first physical object 310, which improves the efficiency of the electronic device providing the reality service.

The disclosure further provides a computer readable storage medium for executing the method for determining physical characteristics of objects. The computer readable storage medium is composed of a plurality of program instructions (for example, a setting program instruction and a deployment program instruction) embodied therein. These program instructions can be loaded into the host 100 and executed by the same to execute the method for determining physical characteristics of objects and the functions of the host 100 described above.

In summary, the embodiments of the disclosure provide a solution to determine the first physical characteristic of the first physical object based on motion behavior of the reference object interacting with the physical object. In one embodiment, first physical characteristic of the first physical object can be used to determine the reference physical characteristic of the first physical object in the visual content of the reality service. Accordingly, the virtual interaction between virtual objects and the first physical object in the visual content can be more realistic, which improves the visual experience of the user.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for determining physical characteristics of objects, adapted to a host, comprising:
   detecting a first physical object in an environment, wherein the environment is a physical environment;
   measuring a first motion behavior of a reference object while the reference object is thrown toward the first physical object by a user, wherein the first motion behavior corresponds to an interact event of the reference object interacting with the first physical object, wherein the reference object is a real object;
   in response to the first motion behavior is measured, calculating a first physical characteristic of the first physical object based on the first motion behavior;

determining a reference physical characteristic of the first physical object in a reality service based on the first physical characteristic of the first physical object, wherein the first physical object is included in a visual content of the reality service;

in response to determining that a virtual object of the reality service virtually interacts with the first physical object in the visual content, determining a movement of the virtual object based on the reference physical characteristic of the first physical object; and correlating the first physical object with a physical location of the environment and storing the first physical characteristic of the first physical object in a database, wherein the first physical characteristic of the first physical object in the database is used for an electronic device providing the reality service to determine the reference physical characteristic of the first physical object in the reality service when locating at the physical location of the environment.

2. The method according to claim 1, wherein the step of detecting the first physical object in the environment comprises:

obtaining an environment image of the environment and detecting the first physical object via performing an image recognition process on the environment image.

3. The method according to claim 1, wherein the step of obtaining the first motion behavior occurs to the reference object in response to interacting with the first physical object comprises:

obtaining a first motion data of the reference object within a specific duration, wherein the interact event of the reference object interacting with the first physical object occurs within the specific duration;

determining the first motion behavior based on a first variation of the first motion data.

4. The method according to claim 3, further comprising:

in response to determining that a moving speed of the reference object reaches a predetermined speed at an i-th timing point in case of the reference object is moved toward the first physical object, determining that the interact event occurs at the i-th timing point, wherein i is an index;

determining a time window based on the i-th timing point, wherein the i-th timing point is within the time window;

determining the time window as the specific duration.

5. The method according to claim 1, wherein the first motion behavior of the reference object comprises at least one of a moving speed, a moving distance, and a deformation degree of the reference object.

6. The method according to claim 1, wherein the first motion behavior of the reference object comprises a moving speed of the reference object, the first physical characteristic of the first physical object comprises a friction coefficient, and the step of determining the first physical characteristic of the first physical object based on the first motion behavior comprises:

in case of the reference object is sliding or rolling on the first physical object, determining a deceleration of the reference object based on the moving speed of the reference object rolling or sliding on the first physical object;

determining the friction coefficient of the first physical object based on the deceleration of the reference object, wherein the friction coefficient of the first physical object is positively related to the deceleration.

7. The method according to claim 1, wherein the first motion behavior of the reference object comprises a moving distance of the reference object, the first physical characteristic of the first physical object comprises an elasticity, and the step of determining the first physical characteristic of the first physical object based on the first motion behavior comprises:

in case of the reference object is moved to the first physical object, determining a rebounding distance of the reference object based on the moving distance of the reference object after the interact event occurs;

determining the elasticity of the first physical object based on the rebounding distance of the reference object, wherein the elasticity of the first physical object is positively related to the rebounding distance.

8. The method according to claim 1, wherein the first motion behavior of the reference object comprises a deformation degree of the reference object, the first physical characteristic of the first physical object comprises a hardness, and the step of determining the first physical characteristic of the first physical object based on the first motion behavior comprises:

in case of the reference object is moved to the first physical object, determining the deformation degree of the reference object during the interact event;

determining the hardness of the first physical object based on the deformation degree of the reference object during the interact event, wherein the hardness of the first physical object is positively related to the deformation degree.

9. A host, comprising:

a non-transitory storage circuit, storing a program code;

a processor, coupled to the non-transitory storage circuit and accessing the program code to perform:

detecting a first physical object in an environment, wherein the environment is a physical environment;

measuring a first motion behavior of a reference object while the reference object is thrown toward the first physical object by a user, wherein the first motion behavior corresponds to an interact event of the reference object interacting with the first physical object, wherein the reference object is a real object;

in response to the first motion behavior is measured, calculating a first physical characteristic of the first physical object based on the first motion behavior;

determining a reference physical characteristic of the first physical object in a reality service based on the first physical characteristic of the first physical object, wherein the first physical object is included in a visual content of the reality service;

in response to determining that a virtual object of the reality service virtually interacts with the first physical object in the visual content, determining a movement of the virtual object based on the reference physical characteristic of the first physical object; and correlating the first physical object with a physical location of the environment and storing the first physical characteristic of the first physical object in a database, wherein the first physical characteristic of the first physical object in the database is used for an electronic device providing the reality service to determine the reference physical characteristic of the first physical object in the reality service when locating at the physical location of the environment.

10. The host according to claim 9, wherein the processor performs:

obtaining a first motion data of the reference object within a specific duration, wherein the interact event of the reference object interacting with the first physical object occurs within the specific duration;

determining the first motion behavior based on a first variation of the first motion data.

11. The host according to claim 9, wherein the first motion behavior of the reference object comprises a moving speed of the reference object, the first physical characteristic of the first physical object comprises a friction coefficient, and the processor performs:

in case of the reference object is sliding or rolling on the first physical object, determining a deceleration of the reference object based on the moving speed of the reference object rolling or sliding on the first physical object;

determining the friction coefficient of the first physical object based on the deceleration of the reference object, wherein the friction coefficient of the first physical object is positively related to the deceleration.

12. The host according to claim 9, wherein the first motion behavior of the reference object comprises a moving distance of the reference object, the first physical characteristic of the first physical object comprises an elasticity, and the processor performs:

in case of the reference object is moved to the first physical object, determining a rebounding distance of the reference object based on the moving distance of the reference object after the interact event occurs;

determining the elasticity of the first physical object based on the rebounding distance of the reference object, wherein the elasticity of the first physical object is positively related to the rebounding distance.

13. The host according to claim 9, wherein the first motion behavior of the reference object comprises a deformation degree of the reference object, the first physical characteristic of the first physical object comprises a hardness, and the processor performs:

in case of the reference object is moved to the first physical object, determining the deformation degree of the reference object during the interact event;

determining the hardness of the first physical object based on the deformation degree of the reference object during the interact event, wherein the hardness of the first physical object is positively related to the deformation degree.

14. A non-transitory computer readable storage medium, the computer readable storage medium recording an executable computer program, the executable computer program being loaded by a host to perform steps of:

detecting a first physical object in an environment, wherein the environment is a physical environment;

measuring a first motion behavior of a reference object while the reference object is thrown toward the first physical object by a user, wherein the first motion behavior corresponds to an interact event of the reference object interacting with the first physical object, wherein the reference object is a real object;

in response to the first motion behavior is measured, calculating a first physical characteristic of the first physical object based on the first motion behavior;

determining a reference physical characteristic of the first physical object in a reality service based on the first physical characteristic of the first physical object, wherein the first physical object is included in a visual content of the reality service;

in response to determining that a virtual object of the reality service virtually interacts with the first physical object in the visual content, determining a movement of the virtual object based on the reference physical characteristic of the first physical object; and correlating the first physical object with a physical location of the environment and storing the first physical characteristic of the first physical object in a database, wherein the first physical characteristic of the first physical object in the database is used for an electronic device providing the reality service to determine the reference physical characteristic of the first physical object in the reality service when locating at the physical location of the environment.

* * * * *